United States Patent [19]

Keilp et al.

[11] 4,374,795
[45] Feb. 22, 1983

[54] PRODUCTION OF MOLD CHARGE OF ELASTOMERIC MATERIAL CONTAINING MAGNETIC OXIDE FILLER

[75] Inventors: John P. Keilp, Secaucus; Warren F. Moore, South Plainfield; Victor Sirbu, Hopatcong, all of N.J.

[73] Assignee: Bell Telephone Laboratories, Incorporated, Murray Hill, N.J.

[21] Appl. No.: 186,195

[22] Filed: Sep. 11, 1980

[51] Int. Cl.³ .............................................. B29C 17/14
[52] U.S. Cl. ....................................... 264/152; 83/19; 83/55; 264/153; 264/328.17; 264/DIG. 58; 264/DIG. 67; 425/510; 425/812
[58] Field of Search .............. 264/152, 153, DIG. 67, 264/328.17, DIG. 58; 83/19, 55; 425/510, 809, 812

[56] References Cited

U.S. PATENT DOCUMENTS

| | | | |
|---|---|---|---|
| 1,522,795 | 1/1925 | Van Valkenburg | 264/153 |
| 2,045,471 | 6/1936 | Kasen | 264/153 |
| 2,141,833 | 12/1938 | Young | 425/809 |
| 2,268,703 | 1/1942 | Dickey | 264/152 |
| 2,688,776 | 9/1954 | Evans et al. | 425/809 |
| 2,745,135 | 5/1956 | Gora | 425/809 |
| 2,943,354 | 7/1960 | Gora | 264/153 |
| 3,344,697 | 10/1967 | Schneider | 83/55 |
| 3,538,600 | 11/1970 | Farrell et al. | 264/153 |

Primary Examiner—James B. Lowe
Attorney, Agent, or Firm—J. P. Kearns

[57] ABSTRACT

A method for preforming magnetic drum material involves the use of a hydraulic press and sleeve which in turn compresses the material and then cuts the material into a specific shape. This process is repeated until the material builds up in the sleeve to the required charge thickness. This method has improved the molding process by eliminating air and gas voids in the molded magnetic drum.

4 Claims, 8 Drawing Figures

PRODUCTION OF MOLD CHARGE OF ELASTOMERIC MATERIAL CONTAINING MAGNETIC OXIDE FILLER

FIELD OF THE INVENTION

This invention relates to apparatus and method for preforming an elastomeric material containing a magnetic oxide filler.

BACKGROUND OF THE INVENTION

In molding elastomeric materials, i.e., those materials that become cross-linked during the molding process in such fashion as to retain their final shape indefinitely, it is known that there are several parameters which must be taken into account to ensure the release of entrapped air and gases from the molded part and thereby prevent voids in the part. It is also known that the problem of voids in parts molded from elastomeric material is particularly acute since these materials cannot be re-molded. Unlike thermoplastic materials, a defective part molded from an elastomeric material cannot be re-ground and molded again.

The major parameters affecting the molding of elastomeric materials are mold temperature, injection pressure (if injection molding process is being used), clamp pressure and cure time. It is known that the adjustment of these parameters may help eliminate the voids in the molded part. It is also known that the adjustment of these parameters affects other properties of the molding material. Thus, it is possible that by adjusting the parameters to eliminate the voids in the molded part, other problems may be created such as gas blisters, underfilled parts, and adherence of parts to the mold.

The problem of entrapped air or gas in the molding material can become more acute with the use of different filler materials such as magnetic oxides or the like. Oftentimes a different filler material will dramatically change the molding parameters associated with the elastomeric material. Thus, adjusting the above-mentioned parameters to facilitate the elimination of voids in the parts may have an adverse effect in relation to other problems that can occur in the molding process.

Although molds can usually be vented to allow entrapped air or gas to escape, some types of mold design represent compromises between venting and charge weight which is the amount of material loaded into the mold. Such mold designs often produce parts with an unacceptable degree of air entrapment when used with certain elastomers, notably those with unusually good permeability characteristics, such as butyl rubber, chlorosulfonated polyethylene, etc. As compression mold designs rarely allow a charge weight greater than 110 percent of the weight of the finished part, it is often impossible to adjust molding parameters to compensate for limited venting.

It was found in molding an elastomeric material with a magnetic oxide filler for a magnetic drum for telephone announcement systems that an entrapped air or gas problem was apparent in the molded part. This created special problems because the drum was subject to substantial additional (and expensive) processing, and the drum had to be discarded if there were voids therein. The voids normally were too deep to be machined out during subsequent processing. Thus, unless this problem was eliminated, there would be considerable economic waste. Conventional adjustment of the molding parameters was found inadequate for preventing the occurrence of voids in the material.

It is an object of this invention to prepare a charge that will eliminate the entrapped air and gas from a part molded from an elastomeric material containing a magnetic oxide or a like filler material and thereby facilitate the production of quality parts by substantially eliminating the occurrence of voids in the molded part.

SUMMARY OF THE INVENTION

According to our invention, air and entrapped gases are forced out of the elastomeric molding material before the molding process takes place. This is accomplished by first flattening the material with a compression member and then preforming the material with a shear or cutting member. These two steps are repeated several times in order to create a stack of preforms with no voids or spaces between them. This process takes place before the actual molding of the material thereby substantially eliminating air and gas entrapment from the process. By eliminating this problem from the molding process, conventional molding parameters such as, clamp pressure, mold temperature, and cure time can be adjusted for optimum manufacturing performance. The gas-expelling process of this invention is especially useful in molding cylindrical parts with high surface to volume ratio from elastomers with good permeability characteristics and is adaptable to production techniques.

BRIEF DESCRIPTION OF THE DRAWING

The above and other objects, features and advantages of this invention will be understood from the following detailed description when read with reference to the drawings in which.

DETAILED DESCRIPTION

Figure 1:
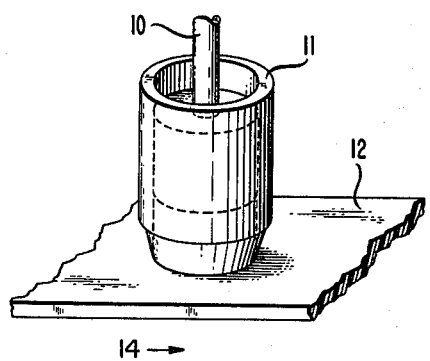
FIG. 1 shows a generalized embodiment of the invention for illustrative purposes.

FIG. 1 shows a generalized illustrative embodiment of the invention comprising ram 10 within sleeve 11 operating on stock material 12. A compressing force is applied to the ram 10 to drive the air and entrapped gas out of the sheet of elastomeric material 12 with magnetic oxide or a like filler. Then a cutting force is applied to the sleeve 11 to cut a disk from the material 12 lying thereunder. The described cutting and compressing force can be produced by commercial or custom hydraulic or air presses. The above-mentioned forces are removed from the ram 10 and sleeve 11, respectively, with the sleeve 11 retaining the disk of material. The sheet of elastomeric material 12 is moved in the direction of arrow 14 and the process is repeated until the desired mold charge height is obtained. When the desired mold charge height is made, the assembly consisting of the ram 10 and sleeve 11 is placed on two blocks (not shown) and a force is applied to the ram 10 to push the mold charge from sleeve 11.

The invention is shown in various stages of operation in FIGS. 2 through 7.

Figure 2:
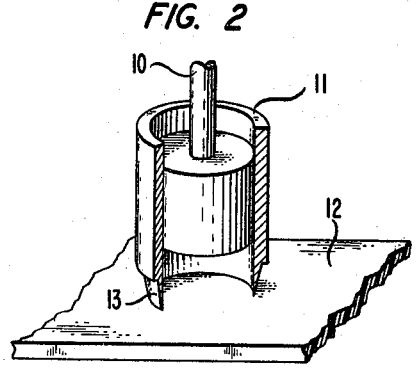
FIGS. 2 through 7 show the succession of steps in the process necessary to provide an air- and gas-free mold charge in the shape of a cylinder.

FIG. 2 shows the component parts of the apparatus: ram 10 and sleeve 11. A sheet of elastomeric material 12 with magnetic oxide or a like filler material is located directly underneath.

Figure 3:
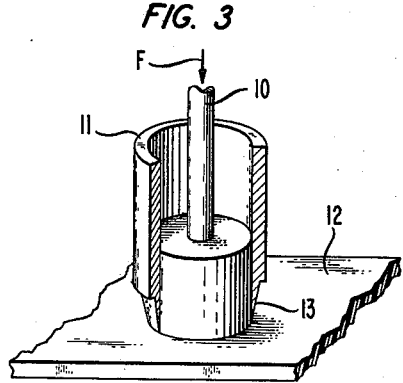

FIG. 3 contains the same elements 10, 11, and 12 as shown in FIG. 2. Here a force (F) is applied to ram 10 for the purposes of flattening and compressing the material to eliminate entrapped air or gasses. Ram 10 is shown in compression contact with filler material 12. Sleeve 11 is unchanged from its position in FIG. 2.

Figure 4:
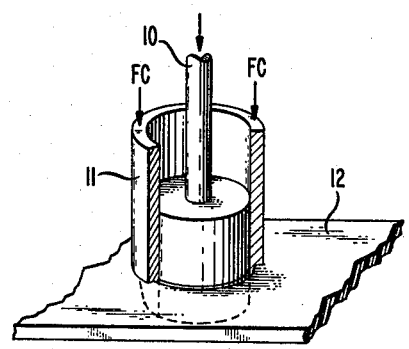

FIG. 4 also contains the same elements 10, 11, and 12 as FIGS. 1 and 2. Here a force (Fc) has been applied to sleeve 11 causing knife edges 13 to cut through material 12 into a predetermined shape (shown here as a shape of circular cross section). In this particular case the knife edges 13 are cutting disks of the thickness of the elastomeric material 12.

Figure 5:
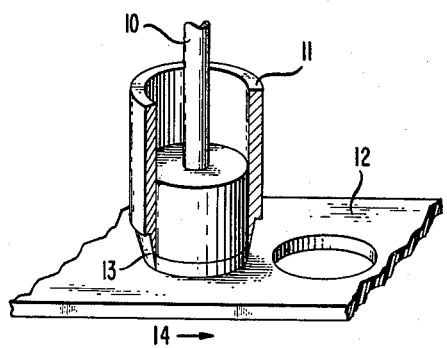

FIG. 5 contains the same elements 10, 11, and 12 as FIGS. 2 through 7. Here the apparatus is back to its original position shown in FIG. 2. Now, however, one disk has been withdrawn from the stock material by retracting both ram 10 and sleeve 11. At the same time the sheet of material 12 has been moved to the right as indicated by arrow 14. The above-mentioned sequence of steps shown in FIGS. 3, 4 and 5 are repeated until the mold charge is built up to the desired thickness.

Figure 6:
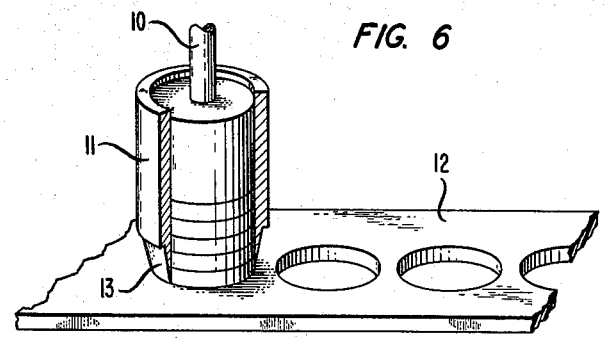

FIG. 6 shows the apparatus after the mold charge has become fused into a solid mass of the desired thickness and cross section.

Figure 7:
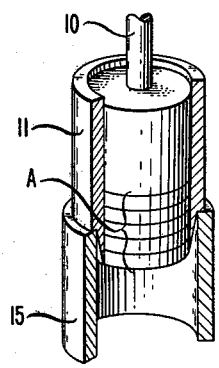

FIG. 7 shows the component parts of the apparatus with the mold charge resting on a support cylinder 15. In FIG. 7 a force is applied to ram 10 and the mold charge is ejected from the apparatus.

The process as described in FIGS. 2 through 7 will produce a virtually air- and gas-free mold charge. This will substantially eliminate voids in parts molded from these mold charges. By eliminating air and gas from the mold charge, the problem with voids in the molded part is eliminated from the molding process and conventional molding parameters can be adjusted to eliminate other molding problems.

Figure 8:
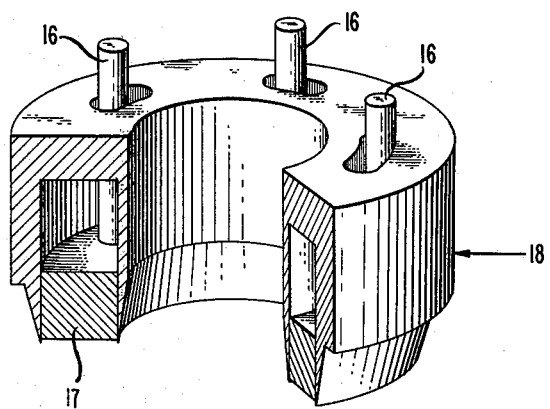
FIG. 8 shows an embodiment of the invention for producing a mold charge in the shape of a ring.

FIG. 8 is a cut-away perspective view of a preferred embodiment of the sleeve and ram which can be used to form the mold charge for a magnetic drum used in a telephone announcement system. The process to produce the mold charge in FIG. 8 is similar to that described in FIGS. 2 through 7. In this illustrative embodiment force is applied to multiple rods 16 to push on ram 17 for the purpose of flattening and compressing the material. A force is applied to the sleeve 18 to produce a torus or annulus in the shape of a flattened donut which allows for more flexibility in the molding process.

The particular elastomeric material used for the application to the formation of magnetic drums is a compound of chlorosulfonated polyethylene and magnetic iron oxide. The final molded part or drum records and reproduces the messages in a telephone announcement system. Voids in the drum would cause unacceptable discontinuities in the recorded messages. Thus, the drum is discarded whenever voids occur. Conventional adjustment of the molding parameters does not always adequately eliminate voids in elastomeric materials used in significant applications like magnetic drums. However, by application of the principles of this invention described in connection with FIGS. 2 through 7 of this specification, voids in parts molded from elastomeric materials are virtually eliminated.

While this invention has been disclosed by means of specific illustrative embodiments, the principles thereof are capable of a wide range of modification by those skilled in the art within the scope of the following claims.

We claim:

1. A method of producing a mold charge from an elastomeric molding material comprising the steps of:
    (1) applying a compression force to a piece of said material to flatten said material and drive out entrapped air and gas therefrom,
    (2) applying a shearing force to said material to shape said material into the desired cross-sectional outline,
    (3) drawing another piece of said material under said prior piece and repeating steps (1) and (2), and
    (4) building up said material by repeating steps (1) through (3) until the desired air- and gas-free mold charge thickness is obtained.

2. The method of claim 1 in which step (2) cuts said material into a disk of circular cross section.

3. The method of claim 1 in which step (2) cuts said material into an annulus of toroidal cross section.

4. The method of claim 1 in which said elastomeric molding material contains magnetic oxide.

* * * * *